(12) United States Patent
Kniess et al.

(10) Patent No.: US 6,376,577 B2
(45) Date of Patent: Apr. 23, 2002

(54) LASER-MARKABLE PLASTICS

(75) Inventors: Helge Kniess, Weiterstadt; Dieter Heinz, Heppenheim; Reiner Delp, Darmstadt; Gerhard Pfaff, Münster; Matthias Kuntz, Seeheim-Jugenheim, all of (DE)

(73) Assignee: Merck Patentgesellschaft, Darmstadt (DE)

( * ) Notice: Subject to any disclaimer, the term of this patent is extended or adjusted under 35 U.S.C. 154(b) by 0 days.

(21) Appl. No.: 09/737,858

(22) Filed: Dec. 18, 2000

(30) Foreign Application Priority Data

Dec. 18, 1999 (DE) .......................................... 199 61 304

(51) Int. Cl.$^7$ ................................................. C08K 3/04

(52) U.S. Cl. ........................ 523/215; 523/210; 524/495; 524/496

(58) Field of Search ................................. 523/210, 215; 524/495, 496

(56) References Cited

FOREIGN PATENT DOCUMENTS

| | | |
|---|---|---|
| EP | 0 053 256 | 10/1981 |
| WO | WO 94/12352 | 11/1993 |

*Primary Examiner*—Edward J. Cain
(74) *Attorney, Agent, or Firm*—Millen, White, Zelano & Branigan P.C.

(57) ABSTRACT

The present invention relates to laser-markable plastics which comprise, as dopant, graphite particles having one or more coatings.

19 Claims, No Drawings

LASER-MARKABLE PLASTICS

The present invention relates to laser-markable plastics which comprise, as dopant, graphite particles having one or more coatings.

The identification marking of products is becoming increasingly important in almost every branch of industry. For example, it is frequently necessary to apply production dates, expiry dates, bar codes, company logos, serial numbers, etc. to plastics or plastic films. These markings are currently mostly executed using conventional techniques, such as printing, hot-stamping, other stamping methods or labelling. However, in particular for plastics, increasing importance is being attached to the contactless, very rapid and flexible method of marking with lasers. With this technique it is possible to apply graphic inscriptions, such as bar codes, at high speed, even to non-planar surfaces. Since the inscription is located within the plastics article itself, it is durably abrasion-resistant.

Many plastics, e.g. polyolefins and polystyrenes, have hitherto been difficult or impossible to mark with a laser. A $CO_2$ laser which emits infrared light in the region of 10.6 $\mu$m brings about only very weak, hardly legible marking on polyolefins or polystyrenes, even using very high power. In the case of polyurethane elastomers and polyether ester elastomers, no interaction occurs with Nd-YAG lasers, but engraving occurs using $CO_2$ lasers. It is not permissible for the plastic to reflect or transmit all of the laser light, since there is then no interaction. Nor must excessively strong absorption take place, however, since in this case the plastics evaporate and all that remains is an engraving. The absorption of the laser beams, and therefore the interaction with the material, depends on the chemical structure of the plastic and on the laser wavelength used. It is often necessary to add appropriate additives, such as absorbers, in order to render plastics laser-inscribable.

Besides $CO_2$ lasers, Nd:YAG lasers are increasingly being used for the identification marking of plastics by laser. The YAG lasers usually used give a pulsed energy beam with a characteristic wavelength of 1064 nm or 532 nm. The absorber material must have pronounced absorption in this specific NIR region in order to exhibit an adequate reaction during fast inscription procedures.

The use of graphite as dopant in laser-marking is known, for example from EP 0 053 256 or WO 94/12352. These markings are pale markings on a black plastics surface. A disadvantage of graphite, however, is that laser inscription produces merely a greyish-brown inscription on a black background, and the inscription then lacks adequate contrast.

It was an object of the present invention, therefore, to find laser-markable plastics which when exposed to laser light can give a white marking with high contrast. The filler should increase the absorption of the laser energy and/or cause the production of gas when impacted by a laser, thus improving the contrast by additionally forming a foam.

Upon further study of the specification and appended claims, further objects and advantages of this invention will become apparent to those skilled in the art.

Surprisingly, it has been found that the laser-markability of plastics, in particular the contrast of the marking, can be improved if use is made of coated graphite particles, such as graphite coated with $CaCO_3$, $CaSO_4$, $Fe_3O_4$ or Turnbull's blue. In comparison with uncoated graphite, the markings achieved are significantly paler, and at the same time the energy densities are lower.

By adding the coated graphite at concentrations of from 0.01 to 4% by weight, based on the polymer system, preferably from 0.3 to 2.5% by weight, and in particular from 0.5 to 2% by weight, high contrast is achieved during laser-marking of thermoplastics.

The concentration of the dopant in the plastic is of course dependent on the polymer system used. The small proportion of coated graphite does not substantially alter the polymer system, and has no effect on its processability.

It is also possible for colorants to be added to the plastics, permitting any type of variation in colour and at the same time ensuring retention of the laser-marking. Suitable colorants are colour pigments, white pigments, black pigments, effect pigments and in particular coloured metal oxide pigments, and also organic pigments and dyes.

Uncoated graphite is available commercially, e.g. from Merck KGaA. The graphite here may be lamellar or of irregular shape.

Suitable graphite lamellae have an average particle size of from 0.1 to 200 $\mu$m, in particular from 0.5 to 20 $\mu$m, and irregularly shaped graphite particles have an average diameter of from 0.1 to 200 $\mu$m, in particular from 1 to 50 $\mu$m.

A coating is applied to the graphite particles in a manner known per se. For example, in the case of Turnbull's blue the coating can take place by treating an aqueous suspension of the graphite at an elevated temperature, preferably>50° C., and at a suitable pH, preferably<6, with an aqueous $K_3[Fe(CN)_6]$ solution and with an aqueous iron(II) salt solution, with stirring. The pH is held constant by simultaneous titration with a base. The coated pigment is filtered off with suction, washed and dried. It is often advisable to add anionic and/or nonionic surfactants to improve properties.

The layer thickness is from 10 to 500 nm, preferably from 20 to 200 nm, in particular from 20 to 150 nm.

Graphite coated with $CaCO_3$, $CaSO_4$, Turnbull's blue or $(Sn,Sb)O_2$ is particularly suitable for laser-marking. Intermediate layers of $SiO_2$, of $SnO_2$ and/or of $TiO_2$ may also be introduced if desired.

Particularly preferred dopants have the following compositions:

Graphite(substrate)+$TiO_2$+$CaCO_3$
Graphite(substrate)+$TiO_2$+$CaSO_4$
Graphite(substrate)+$TiO_2$+Turnbull's blue
Graphite(substrate)+$TiO_2$+$SiO_2$+$(Sn,Sb)O_2$
Graphite(substrate)+$SnO_2$+carbon black+$TiO_2$
Graphite(substrate)+Turnbull's blue.

Any of the known thermoplastics, e.g. those described in Ullmann, Vol. 15, p. 457 et seq., Verlag VCH, may be used for the laser-marking. Examples of suitable plastics are polyethylene, polypropylene polyamides, polyesters, polyester esters, polyether esters, polyphenylene ethers, polyacetal, polybutylene terephthalate, polymethyl methacrylate, polyvinyl acetal, polystyrene, acrylonitrile-butadiene-styrene (ABS), acrylonitrile-styrene-acrylate (ASA), polycarbonate, polyether sulfones, polyether ketones, and also mixtures and/or copolymers of these.

The incorporation of the coated graphite lamellae within the thermoplastic takes place by mixing the plastics pellets with the dopant, followed by shaping with exposure to heat. During incorporation of the dopant, the plastics pellets may, if desired, be treated with adhesion promoters, organic polymer-compatible solvents, stabilizers and/or surfactants resistant to the operating temperatures used. The doped plastics pellets are usually produced by placing the plastics pellets in a suitable mixer, wetting these with any additives, and then adding and incorporating the dopant. The plastics are generally pigmented by way of a colour concentrate (masterbatch) or compound. The resultant mixture may then be directly processed in an extruder or injection-moulding machine. The mouldings formed during the processing have a very homogeneous dopant distribution. Laser-marking with a suitable laser then takes place.

The invention also provides a process for producing the laser-markable plastics of the invention, characterized in that a thermoplastic is mixed with the dopant and then shaped with exposure to heat.

The method of inscription by the laser is such that the specimen is placed in the path of a pulsed laser beam, preferably an Nd:YAG laser. Inscription by a $CO_2$ laser, e.g. by using a mask technique, is also possible. The desired results can also be achieved by other conventional types of laser whose wavelength is within the region of high absorption of the pigment used. The marking obtained is determined by the irradiation time (or number of pulses in the case of pulsed lasers) and by the power emitted by the laser, and also by the polymer system used. The power of the laser used depends on the particular application and can readily be determined by the skilled worker in any particular case.

The laser used generally has a wavelength within the region from 157 nm to 10.6 $\mu$m, preferably within the region from 532 nm to 10.6 $\mu$m. Examples which may be mentioned here are a $CO_2$ laser (10.6 $\mu$m) and an Nd:YAG laser (1064 or 532 nm), and a pulsed UV laser. Excimer lasers have the following wavelengths: $F_2$ excimer laser: 157 nm, Arf excimer laser: 193 nm, KrCl excimer laser: 222 nm, KrF excimer laser: 248 nm, XeCl excimer laser: 308 nm, XeF excimer laser: 351 nm, and frequency-multiplied Nd:YAG laser: wavelength of 355 nm (frequency-tripled) or 265 nm (frequency-quadrupled). Particular preference is given to using Nd:YAG lasers (1064 or 532 nm) and $CO_2$ lasers. The energy densities of the lasers used are generally within the range from 0.3 mJ/cm$^2$ to 50 J/cm$^2$, preferably from 0.3 mJ/cm$^2$ to 10 J/cm$^2$.

In contrast to uncoated graphite particles, where energy densities of from 0.3 to 10 J/cm$^2$ are achieved, the dopant of the invention gives paler markings together with lower energy densities.

When pulsed lasers are used, the pulse frequency is generally within the range from 1 to 30 kHz. Corresponding lasers which can be used in the process of the invention are available commercially.

The pigmented plastics of the invention can be used in any sector where conventional printing processes have hitherto been used to inscribe plastics. For example, mouldings made from the plastics of the invention may be used in the electrical industry, electronics industry or motor vehicle industry. With the aid of laser light, it is possible to produce identification markings or inscription markings even at locations to which it is difficult to gain access on cables, lines, decorative strips, or functional parts in the heating, ventilation or cooling sector, or on switches, plugs, levers or handles which consist of the plastics of the invention. It is also possible for the polymer system of the invention to be used for packaging in the food and drinks sector, or in the toy sector. The markings on the packaging are wipe- and scratch-resistant, resistant to downstream sterilization processes, and can be applied by the marking process in a manner which is hygienically clean. Complete label motifs can be applied durably to the packaging for a reusable system. Another important application sector for laser inscription is that of the marking of plastics to produce individual identification marking for animals, known as cattle tags or ear tags. The information specifically associated with the animal is stored via a barcode system. It can be called up again when required with the aid of a scanner. The inscription must be highly durable since some tags remain on the animals for a number of years.

Plastics articles or mouldings which consist of the plastics of the invention can therefore be laser-marked.

The examples below are intended to illustrate the invention but not to restrict the same. The percentages given are by weight.

The entire disclosure of all applications, patents and publications, cited above and below, and of corresponding German Application No. 199 61 304.4, filed Dec. 18, 1999, is hereby incorporated by reference.

EXAMPLES

EXAMPLE 1

100 g of finely powdered graphite (irregularly shaped graphite particles, particle size about 50 $\mu$m, from Merck KGaA) are suspended in deionized water and heated to 75° C., with stirring. 1 g of anionic surfactant (Texapon N28 from Henkel) and 1 g of nonionic surfactant (Brij 30 from Merck KGaA) are added and incorporated by stirring for 5 minutes. The pH is adjusted to 4.0 using 20% $H_2SO_4$, and then an aqueous $K_3[Fe(CN)_6]$ solution (60.04 g of $K_3[Fe(CN)_6]$ in about 750 ml of deionized water) and an aqueous $FeSO_4$ solution (76.06 g of $FeSO_4 \cdot 7H_2O$ and 12.7 g of $NH_4Cl$ in deionized water acidified with 23 ml of 20% $H_2SO_4$, total volume 750 ml) are added dropwise, separately but simultaneously. The pH is held constant by using 10% $(NH_4)_2CO_3$ solution.

Once addition of the solutions has been completed, stirring is continued for a further 30 minutes. The suspension is then filtered off with suction and washed with deionized water until free from salts. The pigment is then dried for 15 h at 110° C. and screened through a 100 $\mu$m screen.

EXAMPLE 2

PP pellets (HDPP, Stamylen PPH 10 from DSM) is processed by adding 0.5% of the coated graphite from Example 1 during injection moulding. After inscription by a $CO_2$ laser with an energy density of 7 J/cm$^2$, the plaques exhibit a white, abrasion-resistant inscription.

EXAMPLE 3

Comparative Example

PP pellets (HDPP, Stamylen PPH 10 from DSM) is processed by adding 0.5% of graphite (irregularly shaped graphite particles, particle size about 50 $\mu$m, from Merck KGaA) during injection moulding. After inscription by a $CO_2$ laser, the plaques exhibit an inscription whose contrast is poorer than in Example 2.

EXAMPLE 4

100 g of finely powdered graphite (irregularly shaped graphite particles, particle size about 50 $\mu$m, from Merck KGaA) are suspended in deionized water and heated to 75° C., with stirring. 1 g of anionic surfactant (Texapon N28 from Henkel) and 1 g of nonionic surfactant (Brij 30 from Merck KgaA) are added and incorporated by stirring for 5 minutes. The pH is adjusted to 2.2 using 37% HCl, and 100 ml of $TiCl_4$ solution (400 g/l) are added dropwise to the graphite suspension. The pH is held constant using 32% sodium hydroxide solution. The suspension is then cooled to 30° C., with stirring, treated with a $CaCl_2$ solution (146.9 g of $CaCl_2 \cdot 2H_2O$ in 500 ml of water), which is incorporated by stirring. An aqueous $Na_2CO_3$ solution (116 g of $Na_2CO_3$ in 600 ml of water) is then added dropwise.

After addition of the solutions is complete, stirring is continued for a further 30 minutes. The suspension is then filtered off with suction and washed with water until free from salts. The pigment is then dried for 15 h at 110° C. and for 30 minutes at 300° C.

EXAMPLE 5

100 g of graphite lamellae with a particle diameter of 1–100 μm (PB85 from Nishimura Kokuen Co., Ltd.) are suspended in deionized water and heated to 75° C., with stirring. 1 g of anionic surfactant (Texapon N28 from Henkel) and 1 g of nonionic surfactant (Brij 30 from Merck KgaA) are added and incorporated by stirring for 5 minutes. The pH is adjusted to 4.0 using 20% $H_2SO_4$, and then an aqueous $K_3[Fe(CN)_6]$ solution (60.04 g of $K_3[Fe(CN)_6]$ in about 750 ml of deionized water) and an aqueous $FeSO_4$ solution (76.06 g of $FeSO_4 \cdot 7H_2O$ and 12.7 g of $NH_4Cl$ in deionized water acidified with 23 ml of 20% $H_2SO_4$, total volume 750 ml) are added dropwise, separately but simultaneously. The pH is held constant by using 10% $(NH_4)_2CO_3$ solution.

Once addition of the solutions has been completed, stirring is continued for a further 30 minutes. The suspension is then filtered off with suction and washed with deionized water until free from salts. The pigment is then dried for 15 h at 110° C. and screened through a 100 μm screen.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A laser-markable plastic composition comprising a polymer component and a dopant, wherein said dopant comprises graphite particles have one or more coatings.

2. A laser-markable plastic composition according to claim 1, wherein said graphite particles are coated with $CaCO_3$, $CaSO_4$, Turnbull's blue, carbon black, $TiO_2$, $(Sn,Sb)O_2$ (tin dioxide doped with antimony), or combinations thereof.

3. A laser-markable plastic composition according to claim 2, where said graphite particles have one, two, three or four layers of coatings.

4. A laser-markable plastic composition according to claim 1, wherein said graphite particles have two or more coatings and have an intermediate layer of $TiO_2$, $(Sn,Sb)O_2$, or combinations thereof.

5. A laser-markable plastic composition according to claim 1, wherein said dopant comprises graphite lamellae coated with $CaCO_3$, $CaSO_4$, Turnbull's blue, carbon black, $TiO_2$, $(Sn,Sb)O_2$ or combinations thereof.

6. A laser-markable plastic composition according to claim 1, wherein the amount of dopant is 0.01–4% by weight, based on the total weight of the polymer component.

7. A laser-markable plastic composition according to claim 1, wherein the polymer component is polyethylene, polypropylene, polyamide, polyester, polyester ester, polyether ester, polyphenylene ether, polyacetal, polybutylene, terephthalate, polymethyl methacrylate, polyvinyl acetal, polystyrene, acrylonitrile-butadiene-styrene (ABS), acrylonitrile-styrene-acrylate (ASA), polycarbonate, polyether sulfone, polyether ketone, a copolymer thereof, or a mixture thereof.

8. A laser-markable plastic composition according to claim 7, wherein said graphite particles are coated with $CaCO_3$, $CaSO_4$, Turnbull's blue, carbon black, $TiO_2$, $(Sn,Sb)O_2$, or combinations thereof.

9. A laser-markable plastic composition according to claim 8, wherein the amount of dopant is 0.01–4% by weight, based on the total weight of the polymer component.

10. A laser-markable plastic composition according to claim 1, wherein said composition also comprises color pigments, white pigments, black pigments, effect pigments, dyes, or combinations thereof.

11. A process for producing a laser-markable plastic composition comprising mixing at least one thermoplastic polymer or copolymer with graphite particles, wherein said graphite particles have one or more coatings, and then shaping the resultant mixture with exposure to heat.

12. In a process of marking a laser-markable plastic material comprising exposing the material to a laser, the improvement wherein said material is made from a composition according to claim 1.

13. A laser-markable plastic moulding prepared by the process according to claim 11.

14. A laser-markable plastic composition according to claim 6, wherein the amount of dopant is 0.3–2.5% by weight, based on the total weight of the polymer component.

15. A laser-markable plastic composition according to claim 1, wherein said graphite particles are graphite lamellae having an average particle size of 0.1–200 μm, irregularly-shaped graphite particles having an average diameter of 0.1–200 μm, or a mixture thereof.

16. A laser-markable plastic composition according to claim 1, wherein said graphite particles are graphite lamellae having an average particle size of 0.5–20 μm, irregularly-shaped graphite particles having an average diameter of 0.1–50 μm, or a mixture thereof.

17. A laser-markable composition according to claim 1, wherein said graphite particles are: (a) graphite having a $TiO_2$ coating and a $CaCO_3$ coating, (b) graphite having a $TiO_2$ coating and a $CaSO_4$ coating, (c) graphite having a $TiO_2$ coating and a Turnbull's blue coating, (d) graphite having a $TiO_2$ coating, a $SiO_2$ coating and a coating of $(Sn,Sb)O_2$ or combinations thereof, (e) graphite having a $SnO_2$ coating, a carbon black coating, and a $TiO_2$ coating, or (f) graphite having a Turnbull's blue coating.

18. A process according to claim 12, wherein the laser used to mark the plastic material has a wavelength of 157 nm to 10.6 μm.

19. A process according to claim 12, wherein the laser used to mark the plastic material is an Nd:YAG laser, a $CO_2$ laser, or a pulsed-UV laser.

* * * * *